US010271074B2

(12) United States Patent
Henaire et al.

(10) Patent No.: US 10,271,074 B2
(45) Date of Patent: Apr. 23, 2019

(54) LIVE TO VIDEO ON DEMAND NORMALIZATION

(71) Applicant: Facebook, Inc., Menlo Park, CA (US)

(72) Inventors: Mathieu R. Henaire, Redmond, WA (US); Amit Puntambekar, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/396,149

(22) Filed: Dec. 30, 2016

(65) Prior Publication Data

US 2018/0192086 A1    Jul. 5, 2018

(51) Int. Cl.
*H04N 21/845* (2011.01)
*H04N 21/2343* (2011.01)
*H04N 21/234* (2011.01)
*H04N 21/2187* (2011.01)
*H04N 21/472* (2011.01)
*H04N 21/233* (2011.01)

(52) U.S. Cl.
CPC ..... *H04N 21/2343* (2013.01); *H04N 21/2187* (2013.01); *H04N 21/233* (2013.01); *H04N 21/23424* (2013.01); *H04N 21/23439* (2013.01); *H04N 21/47202* (2013.01); *H04N 21/8456* (2013.01)

(58) Field of Classification Search
CPC .......... H04N 7/17318; H04N 21/2385; H04N 21/47202; H04N 21/6125; H04N 7/17354; H04N 21/2368; H04N 21/4307; H04N 21/4341; H04N 7/147; H04N 7/148
USPC ..................................................... 725/86–97
See application file for complete search history.

(56) References Cited

U.S. PATENT DOCUMENTS

| 2009/0031384 | A1* | 1/2009 | Brooks ............ H04N 21/23439 725/127 |
| 2010/0195977 | A1* | 8/2010 | Bennett .............. H04N 21/2343 386/201 |
| 2010/0321469 | A1 | 12/2010 | Jeong et al. |
| 2012/0246677 | A1 | 9/2012 | Fasting |
| 2014/0165116 | A1* | 6/2014 | Major ................ G06F 21/6218 725/89 |
| 2014/0376609 | A1 | 12/2014 | Barkley et al. |
| 2015/0199996 | A1 | 7/2015 | Krishnamurthy et al. |
| 2015/0222815 | A1 | 8/2015 | Wang et al. |
| 2016/0150184 | A1 | 5/2016 | Gandhi |

(Continued)

*Primary Examiner* — Hsiungfei Peng
(74) *Attorney, Agent, or Firm* — Fenwick & West LLP

(57) ABSTRACT

An online system receives live stream content to be provided to one or more client devices as the live stream is ongoing. The online system generates a variety of transcoded live stream content to ensure that client devices can readily playback the appropriately encoded content. Once the live stream ends, the online system determines whether to use a transcoded live stream content or to use the original content received by the online system in order to generate a video on demand. To do so, the online system considers the quality of the original content and issues associated with the original content such as missing video frames or missing audio excerpts. The online system can choose to normalize the original content by eliminating the issues to improve the quality of the normalized original content and subsequently generate the video on demand from the normalized original content.

8 Claims, 6 Drawing Sheets

(56) References Cited

U.S. PATENT DOCUMENTS

2016/0173736 A1\* 6/2016 Kniazev ................ G06F 17/17
348/625

\* cited by examiner

LIVE TO VIDEO ON DEMAND NORMALIZATION

BACKGROUND

This disclosure generally relates to generating a video on demand, and more specifically to generating a high quality video on demand from a previous live stream in multiple phases within an online system.

Live media streams are increasingly popular today given that they serve as a convenient method for stream hosts to provide interesting content to their viewers in real-time. Online systems for processing and distributing the live stream to various viewers need to rapidly process the live stream to provide the live stream in real time to the viewers. After a live stream finishes, an online system often converts the live stream content to a video on demand (VOD) such that individuals can watch or re-watch portions of the previous live broadcast stream content in later time and on demand. As one option, the online system can generate a video on demand using the content that was previously processed and distributed as the live VOD. However, content that was previously processed by the online system may be of lower quality under the constraints of real time distribution. Thus, viewers that watch a video on demand derived from previously processed content may experience a poor viewing experience due to the low quality of the processed content.

SUMMARY

An online system serves as a media content distribution platform that receives, processes, and distributes media content to viewers. Here, the content may be a live content (e.g. a live stream provided by a content provider device) or non-live content such as a video on demand that is generated from a completed live stream.

If the content is a live stream, the online system receives data packets (e.g. segments) of video and audio information provided by a content provider as the live stream is ongoing. The online system can transcode the live video and audio content and distribute transcoded content as data packets (e.g. segments) or choose to skip the transcoding step and distribute the original data packets without transcoding to various client devices such that a viewer of the client device can consume the live stream. The online system can transcode the live video and audio content into a variety of different encodings to ensure that any client device that requests to access the live stream is able to receive the appropriately encoded live video and audio.

After a live stream of the media content finishes, the online system generates a video on demand from the live stream content in one or more phases. In the first phase, the online system retrieves the live video and audio content that were previously transcoded and distributed to client devices. Additionally, the online system also retrieves the original video and audio data that was provided by the content provider. The original video and audio data remains unprocessed by the online system, and therefore, has higher quality in comparison to the corresponding transcoded video and audio data. However, the original video and audio information may also include issues that adversely impact the viewing experience such as missing video frames, missing audio excerpts or unsynchronized video and audio data.

To generate a VOD in the first phase immediately after the live stream finishes, the online system concatenates the previously transcoded live video and audio data to generate a first, but lower quality VOD of the media content; the online system also concatenates the original video and audio data received from the content provider to generate a second, but higher quality VOD of the media content. The online system determines whether the improved quality of the original video and audio in the second VOD is a significant enough improvement over the previously transcoded video and audio in the first VOD in order to commit computing resources towards removing the significant issues that may be associated with the original video and audio information. If the online system decides to remove the issues associated with the original video and audio information, then during the second phase, the online system normalizes the original video and audio data in the second VOD. Therefore, the online system removes the issues and generates a VOD from the normalized video and audio content, which has better quality than the VOD generated from the original video and audio data. Therefore, this VOD includes video and audio content that is of the highest quality among the three VODs from two phases, and therefore, can provide a user an improved viewing experience in comparison to a VOD that is generated from previously transcoded video and audio content. Upon receiving a request from a client device, the online system provides the generated VOD for playback.

The figures depict various embodiments for purposes of illustration only. One skilled in the art will readily recognize from the following discussion that alternative embodiments of the structures and methods illustrated herein may be employed without departing from the principles of the invention described herein.

DETAILED DESCRIPTION

Overview of System Environment

Figure 1:
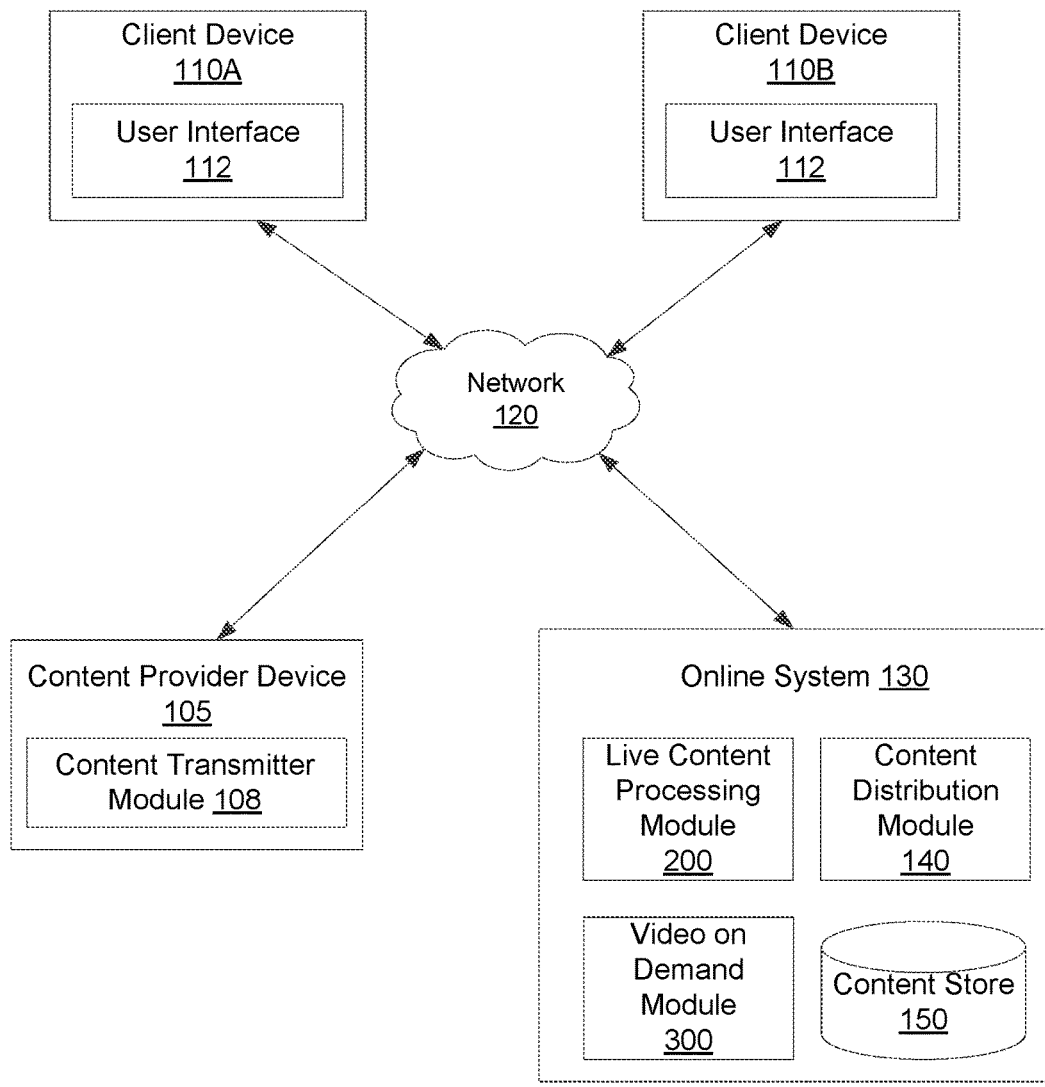
FIG. 1 illustrates a system environment including an online system for generating high quality video on demand from live streaming content, in accordance with an embodiment.

FIG. 1 illustrates a system environment 100 including an online system 130 that can receive and transmit content. The system environment 100 includes a content provider device 105, one or more client devices 110, and an online system 130, each of which is connected to the network 120. The online system 130 further includes a live content processing module 200, a video on demand module 300, and a content distribution module 140. Although the system environment 100 depicts two client devices 110A and 110B and one content provider device 105, one may envision a system environment 100 that includes any number of client devices 110 and content provider devices 105.

FIG. 1 and the other figures use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral (e.g. "110" in the text refers to reference numerals "110A" and/or "110B" in the figures).

Each content provider device 105 provides content to the online system 130 through the network 120. Each content provider device 105 includes a content transmitter module 108 responsible for transmitting and/or generating the content. As one example, the content provider device 105 can provide live content to the online system 130. Therefore, the content transmitter module 108 includes a processor coupled to an optical device (e.g. camera) that records video and audio information. As used hereafter, live content refers to content that is intended to be consumed by a viewer of a client device 110 in real-time (e.g. simultaneously) while the live content is generated by the content provider device 105. Thus, the online system 130 needs to immediately process and transmit the live content to client devices 110 when the live content is received from a content provider device 105.

In both examples, the content transmitter module 108 is further responsible for encoding the content. The content transmitter module 108 encodes the content according to configurations of the content provider device 105. In various embodiments, the content transmitter module 108 separately encodes the video and the audio components of the content. For example, in regards to the video, the content provider device 105 may generate a video with a particular setting (e.g. video resolution, frame rate) which triggers the content transmitter module 108 to select an appropriate encoder to encode the video based on the selected setting. As an example, the content transmitter module 108 can encode the video portion of the content using a first encoder (e.g. H.264) and the audio portion of the content using a second encoder (e.g. advanced audio coding, AAC).

Regarding the audio content, the content transmitter module 108 may be instructed to generate audio data with a particular audio setting (e.g. bit rate, mono/stereo sound). Thus, the content transmitter module 108 encodes the audio based on the selected audio setting. For example, the content transmitter module 108 may, by default, select AAC as the audio encoder. In various embodiments, if the user selects a high bit rate and wants to maintain the quality of the audio in the stream, the content transmitter module 108 can select audio interchange file format (AIFF) or other encoders (e.g. lossless encoders) that ensures the high quality of the audio stream.

After encoding the video and audio of the content, the content provider device 105 sends the content through the network 120 to the online system 130 to be transmitted to one or more client devices 110. For example, given that the content is live video and live audio, the content provider device 105 sends individual data packets of live video and individual data packets of live audio. Each data packet is sent according to standard protocols such as real time transport protocol (RTP) over universal datagram protocol (UDP). Therefore, each data packet may have a predetermined payload size based on the standard protocol. In various embodiments, the content provider device 105 also includes information associated with the content that describes the encoders that were used to encode the video and audio. This information may be included in a RTP header associated with the data packet payload.

The online system 130 receives the live video and audio stream from the content provider device 105, transcodes the content to generate transcoded content in one or more formats (e.g., different resolutions, different bit rates and different frame rates), and distributes the content in segments to client devices 110 so that the client device 110 can play back the live stream. Further reference will be made in regards to FIG. 4A which depicts the distribution of content to the client devices 110.

In various embodiments, the online system 130 includes a live content processing module 200 for appropriately processing and transcoding the received live stream. To ensure that all client devices 110 that request access to the live stream can appropriately playback the live stream, the live content processing module 200 may generate a wide variety of live content encodings. For example, the live content processing module 200 may generate a first live video encoding using a H.264 encoder and a first live audio encoding using an advanced audio coding (AAC) encoder. Additionally, the live content processing module 200 may generate a second live video encoding using a VP9 encoder and a second live audio encoding using an MP3 encoder. Further encodings may also be generated. The live content processing module 200 will be further discussed below in regards to FIG. 2.

In various embodiments, the online system 130 also includes a content distribution module 140 for distributing the content. As one example, the content may be a live stream that has been processed and transcoded by the live content processing module 200. As another example, the content may be the original live stream provided by the content provider device 105 that the online system 130 has not processed or transcoded; therefore, this content has an original encoding. The content distribution module 140 may receive a request from a client device 110 to access the live stream. Therefore, the content distribution module 140 distributes segments (e.g. data packets) of the content to the requesting client device 110. For example, referring to FIG. 4A, the online system 130 may distribute encoded content 1 (405) of a media stream that is of a first level of quality to a first client device 110A, encoded content 2 (410) of the media stream that is of a second level of quality to a second client device 110B, and original content 415 of the media stream to an Nth client device client device 110N. Each encoded content 405, 410, and 415 is delivered in segments (e.g. segment 1, segment 2, etc.) over time to their respective client devices 110. For each encoding, the content distribution module 140 can store the content segments that it has distributed in the content store 150.

Figure 4A:
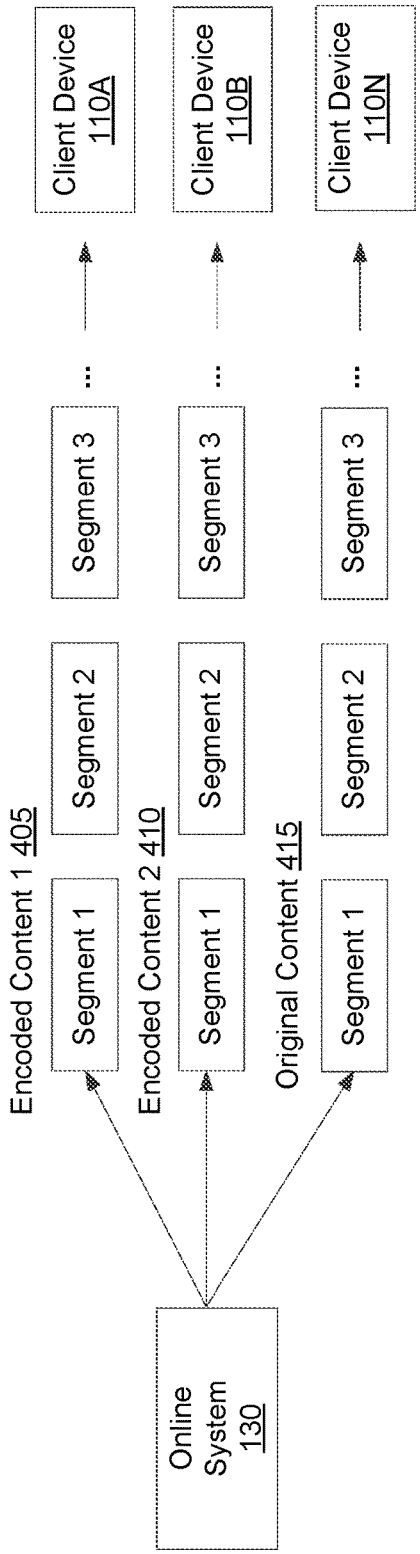
FIG. 4A depicts the sending of live stream content by an online system to one or more client devices, in accordance with an embodiment.
Figure 4B:
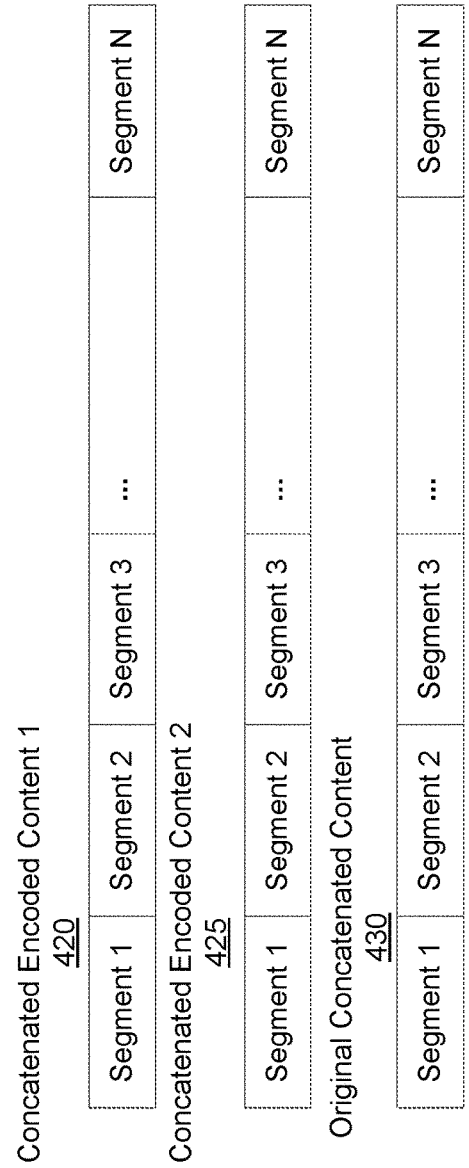
FIG. 4B depicts the generation of concatenated content for creating a video on demand, in accordance with an embodiment.

Returning to FIG. 1, in various embodiments, the online system 130 includes a VOD module 300 that generates a VOD from the completed live stream. The VOD module 300 retrieves the various segments of the different encoded content 405, 410, and 415 that were previously distributed by the content distribution module 140. For example, the VOD module 300 may retrieve encoded content 1 (405) that includes the set of individual live video segments that are each encoded using a particular video encoder (e.g. H.264). The VOD module 300 can also retrieve encoded content 2 (410) that includes the second set of live video that were encoded using a different encoder (e.g. VP9). The VOD module 300 can also retrieve the original content 415 that includes the third set of live video that were encoded by the content provider device 105. Referring to FIG. 4B, the VOD module 300 assembles the segments of encoded content 1

(405) into concatenated encoded content 1 (420), the segments of encoded content 2 (410) into concatenated encoded content 2 (425) and original content 415 into original concatenated content (430). Each concatenated encoded content, e.g., 420, 425 and 430, can be served as a phase 1 VOD of the media stream after the live broadcasting of the media stream. Additional concatenated encodings may also be generated. Although the previous examples specifically describe live video in regards to the different encoded content 405, 410, original content 415, concatenated encoded content 420, 425, and original concatenated content 430, one skilled in the art may appreciate that each encoded content 405, 410, original content 415, concatenated encoded content 420, 425, and original concatenated content 430 also includes live audio that is handled in a similar manner.

The VOD module 300 generates a VOD from the live stream using one of the concatenated encoded content 420 or 425 or the original concatenated content 430, e.g., selecting one of the VODs generated from the concatenated encoded content 420 or 425 and the original concatenated content 430. The concatenated content that is used to generate the VOD represents a balance between the video and audio quality of the VOD and the resources that are required to generate the VOD. For example, although the highest quality video/audio content may be the original concatenated content 430, it may also include issues such as video and audio content that are out of sync. This is because the original content 415 in the original concatenated content 430 derives from the content provider device 105 and does not undergo transcoding that may remove a subset of the issues associated with the original content 415 (e.g., removing artifacts in the video frames of the original encoding 415). Therefore, the VOD module 300 decides whether to generate a VOD using concatenated encoded content 420, 425, or to proceed with normalizing the original concatenated content 430 to correct the issues associated with the original concatenated content 430. More specifically, if the VOD module 300 decides that excessive resources are required to correct the issues of the original concatenated content 430, the VOD module 300 generates the VOD from one of the concatenated encoded content 420, 425. Otherwise, the VOD module 300 corrects the issues of the original concatenated content 430 and generates the VOD. Further discussion regarding the VOD generation process is described below in regards to FIG. 3.

A client device 110 is a computing device capable of receiving the content (e.g. a live stream or a VOD) from the online system 130 through the network 120 and playing back the content for a viewer of the client device 110. Examples of client devices 110 include desktop computers, laptop computers, tablet computers (pads), mobile phones, personal digital assistants (PDAs), gaming devices, or any other electronic device including computing functionality and data communication capabilities. In various embodiments, a client device 110 also includes a user interface 112 that is configured to receive user inputs from a user of the client device 110. For example, the user interface 112 may be a touchscreen that the user of the client device 110 can use to login to the online system 130 and access his/her user profile that is stored on the online system 130. In another example, a user can use the user interface 112 of the client device 110 to send a request to the online system 130 for a live stream or a VOD. Once the client device 110 receives the live stream or VOD, it appropriately decodes the content and plays the decoded content on the user interface 112 of the client device 110.

The network 120 facilitates communications among one or more client devices 110, the online system 130. The network 10 may be any wired or wireless local area network (LAN) and/or wide area network (WAN), such as an intranet, an extranet, or the Internet. In various embodiments, the network 120 uses standard communication technologies and/or protocols. Examples of technologies used by the network 120 include Ethernet, 802.11, 3G, 4G, 802.16, or any other suitable communication technology. The network 120 may use wireless, wired, or a combination of wireless and wired communication technologies. Examples of protocols used by the network 120 include transmission control protocol/Internet protocol (TCP/IP), hypertext transport protocol (HTTP), simple mail transfer protocol (SMTP), file transfer protocol (TCP), or any other suitable communication protocol.

Processing Live Video and Audio Content

Figure 2:
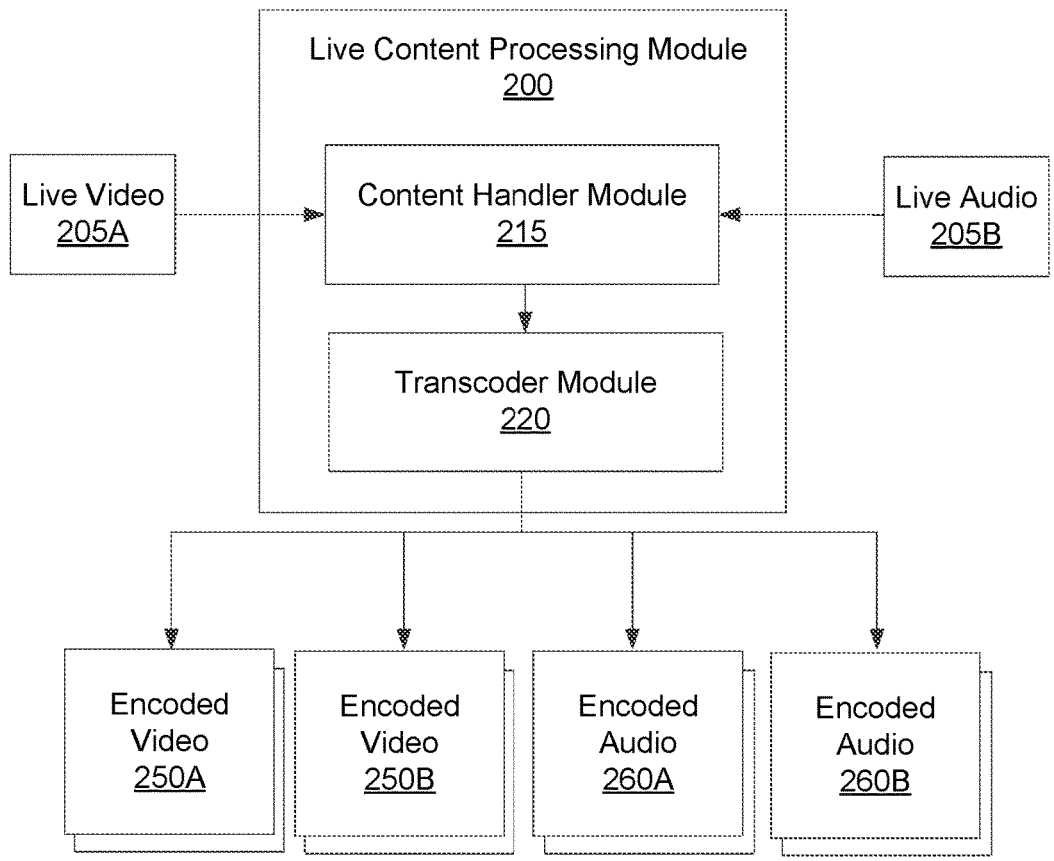
FIG. 2 illustrates a flow diagram for the live content processing module of the online system, in accordance with an embodiment.

FIG. 2 illustrates a flow diagram for the live content processing module 200 of the online system 130, in accordance with an embodiment. The live content processing module 200 processes and transcodes content received by the online system 130. For example, if the content is a live stream that is to be immediately transmitted to viewers, the live content processing module 200 transcodes the live stream and passes the transcoded live stream along to the content distribution module 140 to be distributed to one or more client devices 110. In various embodiments, the live content processing module 200 includes a content handler module 215 and a transcoder module 220 for receiving and transcoding the content, respectively.

The content handler module 215 receives the content including live video 205A and live audio 205B that originates from a content provider device 105. As previously described, each live video 205A and live audio 205B component may be previously encoded (e.g. by the content provider device 105) according to settings or configurations associated with the content provider device 105. If the content is live content, the content handler module 215 receives multiple data packets corresponding to live video 205A and live audio 205B over the course of the live stream.

The content handler module 215 processes the live video 205A and live audio 205B information according to the standard protocol. Given that live content needs to be transmitted immediately to client devices 110, the designated protocol that the content handler module 215 uses may be RTP over UDP. This ensures that the content handler module 215 can readily receive and send the live video 205A and live audio 205B to the transcoder module 220 with limited latency. For example, the content handler module 215 may skip over data packets that are lost while in transmission from the content provider device 105. In various embodiments, the data packets may be identifiably tagged such that the content handler module 215 may re-sequence the data packets if they are received out of order. After processing the live video 205A and live audio 205B data, the content handler module 215 sends them to the transcoder module 220 for transcoding.

In some scenarios, the content handler module 215 provides the live video 205A and live audio 205B data directly to the content distribution module 140. For example, the content handler module 215 determines that the received live video 205A and live audio 205B is of high fidelity and was previously encoded by the content provider device 105 using a widely accessible encoder. Therefore, the content handler module 215 decides that the live video 205A and live audio 205B need not undergo additional transcoding and is directly provided to the content distribution module 140 to be distributed to client devices 110. Additionally, the live video 205A and live audio 205B are stored in the content store 150 of the online system 130. Therefore, the live video 205A and live audio 205B can be later retrieved as original video and original audio to be considered when generating the VOD.

The transcoder module 220 receives and transcodes the live video 205A and live audio 205B. To appropriately do so, the transcoder module 220 may receive information associated with each live video 205A and live audio 205B file that specifies the encoder that was previously used to encode each file. For example, the encoder information may have been included in the RTP header. A content provider device 105 may have previously encoded a video using a H.264 encoder and an associated audio file using AAC encoding. Therefore, the metadata information specifies these encoders such that the transcoder module 220 may retrieve the H.264 and AAC decoder to appropriately decode the video and audio files, respectively, to an intermediate format.

Once the transcoder module 220 decodes the video 205A and audio 205B into an intermediate format (e.g., YUV for video data and pulse-code modulation (PCM) for audio data), the transcoder module 220 can further alter or edit the intermediate video and intermediate audio. For example, the decoder module 220 may crop the decoded video or change the audio bitrate of the decoded audio. This may be necessary because the live video 205A and live audio 205B originate from a variety of content provider devices 105 and therefore, may need to be altered to fit the standards of the online system 130.

The transcoder module 220 retrieves the appropriate encoder to encode the video and audio content to generate live transcoded video 250 and live transcoded audio 250. In various embodiments, the transcoder module 220 generates live transcoded video 250 using a variety of different encoders. This ensures that for any client device 110 that requests to access the live stream, the online system 130 can provide a live transcoded video 250 and live transcoded audio 250 that was appropriately transcoded and is compatible for play back by the client device 110. For example, for a single live video 205A that was received by the content handler module 215, the transcoder module 220 can produce a first live transcoded video 250A using a H.264 encoder, a second live transcoded video 250B using a VP9 encoder, and an Nth live transcoded video 250N using a Windows Media Video (WMV) encoder. Similarly, the transcoder module 220 can produce multiple live transcoded audio 260A, 260B . . . and 260N using a variety of encoders. Although FIG. 2 depicts two different live transcoded video 250 and two different live transcoded audio 260, the transcoder module 220 may generate significantly more video and audio encodings. Given that the content is a live stream, each live transcoded video 250 and live transcoded audio 260 is composed of segments, where each segment is sent to the content distribution module 140 for distribution to client devices 110 in real-time.

In various embodiments, the transcoder module 220 employs a decision-making engine that decides the optimal set of encodings that would be required for the live video and live audio. Thus, the transcoder module 220 need not encode the live video and live audio using every possible encoder to conserve resources. For example, the decision-making engine may consider various characteristics including the characteristics of the content provider device 105, characteristics of the client devices 110, and characteristics of the user that is providing the live stream to the online system 130. For example, the content provider device 105 may have been captured by the content provider device 105 with a low video resolution (e.g. 480p). Therefore, the decision-making engine would eliminate encodings that are of a higher video resolution (e.g. 720p, 1080p, 4K). As another example, the majority of client devices 110 may not be able to handle 4 k video resolution. Therefore, the decision-making engine would eliminate encodings that are for 4 k video resolution while maintaining encodings for video resolutions that can be handled by the client devices 110. As a third example, the user of the online system 130 that provides the live stream may be wildly popular based on previous live streams hosted by the user of the online system 130. The decision-making engine may decide to select all possible encodings for a highly popular user whereas the decision-making engine may only a select a small subset of encodings for a less popular user.

Having generated the live transcoded video 250 and live transcoded audio 260 with various encodings, the live content processing module 200 sends segments of each to the content distribution module 140 to be sent to client devices 110 in real-time. As an example, the content distribution module 140 caches the live transcoded video 250 and live transcoded audio 260 to ensure that they can rapidly be delivered to a client device 110 upon request. More specifically, the live transcoded video 250 and live transcoded audio 260 may undergo HTTP caching and be distributed in a content distribution network (CDN).

Additionally, the live transcoded video 250 and live transcoded audio 260 are stored in a content store 150. Therefore, they may be retrieved at a later time point when the live stream is completed so that the VOD can be generated.

Generating an Optimal Video on Demand

Figure 3:
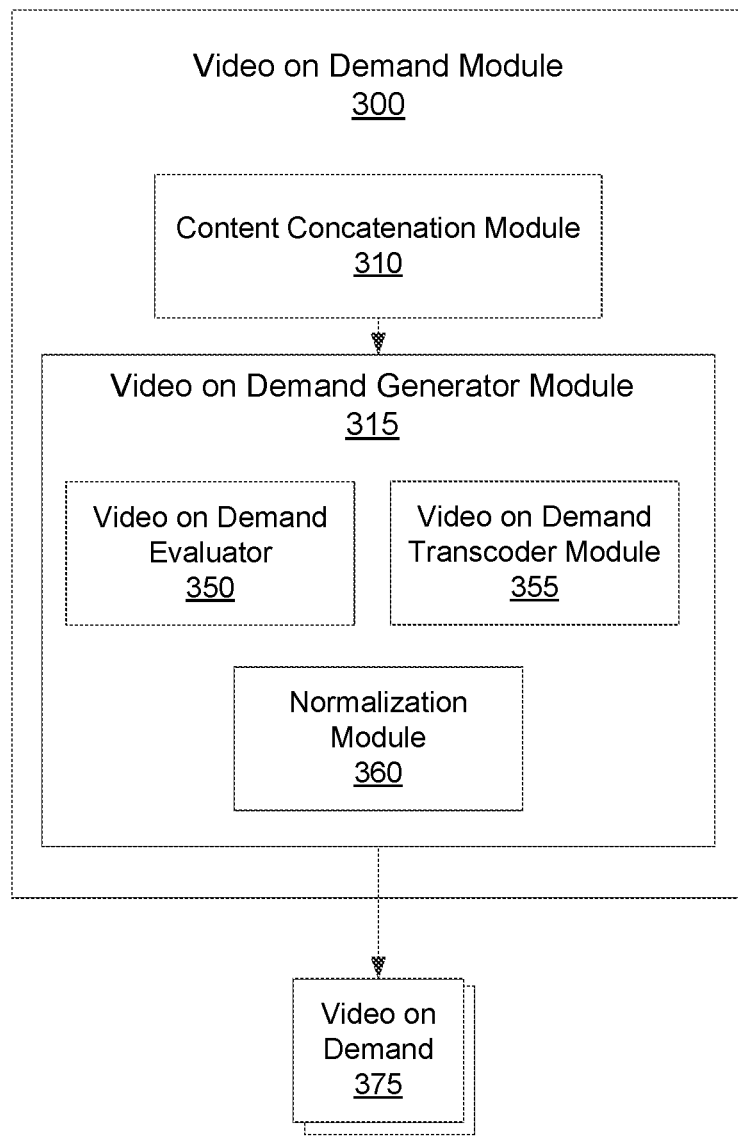
FIG. 3 illustrates a flow diagram for the video on demand module of the online system, in accordance with an embodiment.

FIG. 3 illustrates a flow diagram for the VOD module 300 of the online system, in accordance with an embodiment. The VOD module 300 generates a VOD from a live stream such that a viewer can re-watch the content of the live stream by accessing the VOD. In various embodiments, the VOD module 300 employs a content concatenation module 310 and a VOD generator module 315 to generate an optimal video on demand 375. Further reference will be also made to FIGS. 4A and 4B.

The content concatenation module 310 retrieves the different live transcoded videos (e.g. 250A, 250B) and live transcoded audios (e.g. 260A, 260B) from the content store 150. As an example, in reference to FIG. 4A, encoded content 1 (405) may correspond to a first live transcoded video 250A and first live transcoded audio 260A whereas encoded content 2 (410) may correspond to a second live transcoded video 250B and second live transcoded audio 260B. Additionally, the content concatenation module 310 may retrieve an original content 415 that includes video/audio segments that were originally received from the content provider device 105. Thus, the content concatenation module 310 generates concatenated content 420, 425, and 430 from the segments of the encoded content 405, 410 and original content 415, respectively. The content concatenation module 310 sends the different concatenated contents 420, 425, and 430 to the VOD generator module 315.

The VOD generator module 315 receives the different concatenated contents 420, 425, and 430 and generates the VOD 375 using one of the concatenated contents based on a variety of factors. To achieve this, the VOD generator module 315 may employ a VOD evaluator 350, a VOD transcoder module 355, and a VOD normalization module 360. Further reference will made in regards to FIG. 5A which illustrates the original concatenated video and original concatenated audio prior to normalization as well as FIG. 5B which illustrates the original concatenated video and original concatenated audio following normalization.

The VOD evaluator 350 evaluates the different concatenated contents 420, 425, and 430 to determine which concatenated content to use in order to generate the VOD 375. In one embodiment, the VOD evaluator 350 may decide that the VOD 375 should be generated from a lower quality concatenated encoding using either the concatenated encoded content 1 (420) and/or the concatenated encoded content 2 (425)) that includes content segments that were previously transmitted to client devices 110 during the live stream. Therefore, a viewer that accesses the VOD 375 will have the same viewing experience as a viewer that accessed the live stream.

In many scenarios, the original concatenated content 430 includes video and audio that are of higher quality (e.g. higher video resolution, higher audio bitrate) in comparison to the other concatenated encoded content 420 and 425 because the original concatenated content 430 has not previously undergone a transcoding process. Therefore, a viewer that accesses a VOD 375 derived from original concatenated content 430 may, in some cases, experience an improved viewing experience. However, given that the original concatenated video and original concatenated audio have not undergone transcoding, they may each include issues such as lost video frames, lost audio excerpts, and incorrectly associated timestamps with video frames or audio excerpts. These missing frames and missing audio excerpts may arise from a variety of sources. As one example, the content provider device 105 may send the live video 205A and live audio 205B using RTP over UDP. Given that RTP over UDP is willing to absorb loss of data packets (e.g. video frames and/or audio excerpts) for the sake of displaying the live content in real-time, the online system 130 may not receive every video frame and audio excerpt sent by the content provider device 105. Therefore, the VOD evaluator 305 evaluates a tradeoff between the higher quality of the original concatenated content 430 and the resources needed to remove the significant issues that may be associated with the original concatenated content 430.

The VOD evaluator 305 evaluates a variety of factors. A first factor is the total number of issues (e.g. missing video frames, missing audio excerpts) that need to be removed from the original concatenated content 430 in order to generate a VOD that would not significantly degrade the viewer experience. Additionally, the VOD evaluator 305 may consider the issues, if any, that remain in the concatenated encodings 420 or 425. If the original concatenated content 430 is of high fidelity (e.g. minimal issues), then the VOD evaluator 305 can choose to generate the VOD by normalizing the original concatenated content 430 to remove the minimal issues that exist. However, if the original concatenated content 430 has numerous issues which would require significant resources to correct for, the VOD evaluator 305 may choose to proceed with generating a VOD from concatenated encoded content 1 (420) or concatenated encoded content 2 (425). Alternatively, if the concatenated encoded content 420 or 425 also includes numerous issues, the VOD evaluator 305 may choose to proceed with normalizing the original concatenated content 430.

A second factor is the overall duration of the original concatenated content 430. If the duration of the original concatenated content 430 is above a certain threshold, then even parsing through the content to identify the total number of issues may utilize an excessive amount of resources. Thus, the VOD evaluator 305 chooses the concatenated encoded content 420 or 425. A third factor includes the difference in quality of the original concatenated 430 in comparison to concatenated encoded content 420 or 425. As an example, if concatenated encoded content 1 (420) includes audio in a lossless Waveform Audio File Format (WAV), then the audio quality between the original concatenated content 430 may not differ significantly in comparison to the lossless WAV audio in concatenated encoded content 1 (420).

In various embodiments, the VOD evaluator 305 generates a score to evaluate whether the VOD module 300 should generate a VOD by normalizing the original concatenated content 430 or by utilizing a concatenated encoded content 420 or 425. If the score is above a threshold score, the VOD evaluator 305 decides to utilize a concatenated encoded content 420 or 425 to generate a VOD 375. Alternatively, if the score is below a threshold score, the VOD evaluator 305 chooses to normalize the original concatenated content 430 to generate the VOD 375.

The VOD evaluator 305 increases the score with increasing number of issues that are determined to be associated with the original concatenated content 430. In other embodiments, the score may be directly proportional to the number of issues. Similarly, the VOD evaluator 305 increases the score for an original concatenated content 430 that is longer in duration as normalizing a longer original concatenated content 430 would require a significant expenditure of computing resources by the online system 130.

The VOD evaluator 305 also considers the quality of the original concatenated content 430 and quality of the concatenated encoded content 420 or 425 in its determination. For example, if the quality of the original concatenated content 430 is not an acceptable improvement over the alternative concatenated encoded content 420 or 425, then the VOD evaluator 305 increases the score. In other embodiments, if the quality of the original concatenated content 430 is not an acceptable improvement over the alternative concatenated encoded content 420 or 425, then the VOD evaluator 305 decreases the threshold score, thereby increasing the likelihood that the generated score is above the threshold score. Conversely, if the quality of the original concatenated content 430 is significantly better than the alternative concatenated encoded content 420 or 425, the VOD evaluator 305 may decrease the generated score or increase the threshold score.

The VOD transcoder module 355 transcodes the original concatenated content 430 in order to generate the VOD 375. As a first step, the VOD transcoder module 355 retrieves the original concatenated content 430 that includes both video and audio data and decodes them accordingly. The VOD transcoder module 355 generates an original concatenated video and original concatenated audio by encoding the decoded video and audio data and provides them to the VOD normalization module 360 for normalization.

In various embodiments, the VOD transcoder module 355 may employ a decision-making engine to decide an optimal set of encodings that would be required to encode the normalized versions of the original concatenated video and original concatenated audio. This decision-making engine may be similar to the previously described decision-making engine employed by the transcoder module 220. The decision-making engine can reduce the amount of resources that would be committed towards the process of unnecessarily encoding video and/or audio content that are not distributed to client devices 110. Additional details regarding the decision-making engine for identifying an optimal set of encodings are described in U.S. patent application Ser. No. 15/396,064, filed Dec. 30, 2016, which is hereby incorporated by reference in its entirety.

The VOD transcoder module 355 generates the optimal set of encodings for the original concatenated video and original concatenated audio. Together, an encoded original concatenated video and an encoded original concatenated audio that may be played back by a client device 110 is considered a VOD 375. In various embodiments, instead of generating a VOD 375 from the original concatenated content 430, the VOD generator module 315 generates a VOD 375 derived from a concatenated encoded content 420 or 425 that includes previously transcoded content. For example, if the VOD evaluator 350 determined that it would be too resource intensive to remove the issues associated with the original concatenated content 430, then the VOD generator module 315 utilizes a concatenated encoded content 420 or 425 to generate a VOD 375. Thus, the VOD module 300 generates various VODs 375 and provides them for storage in the content store 150 of the online system 130 for subsequent retrieval and transmittal when a client device 110 requests to access the VOD 375.

Figure 5A:
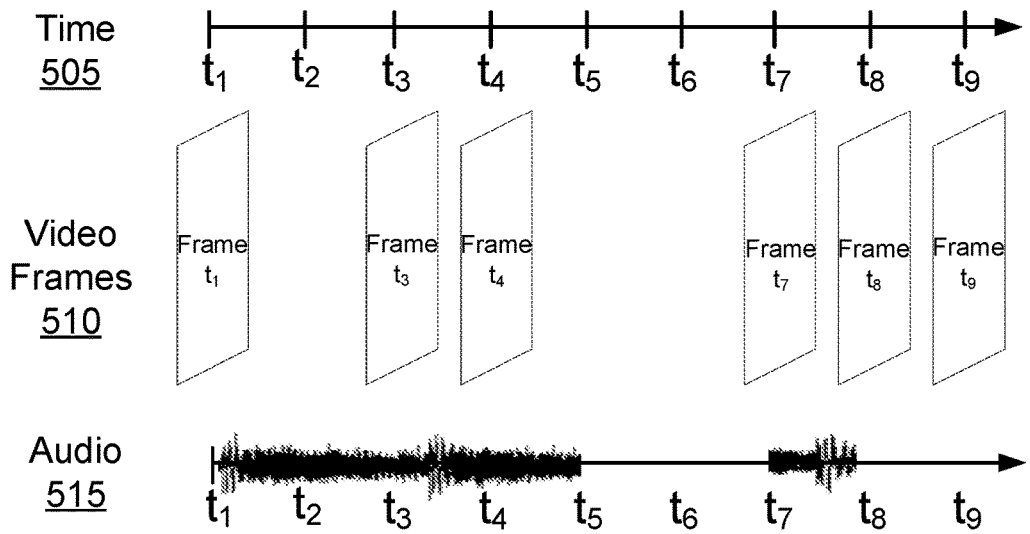
FIG. 5A and FIG. 5B illustrate the process of normalizing video and audio content, in accordance with an embodiment.

The VOD normalization module 360 is responsible for normalizing the transcoded original concatenated video and original concatenated audio to eliminate any issues associated with either. Referring to FIG. 5A, as one example, the issues previously identified by the VOD evaluator 350 may be misaligned timestamps of the individual video frames 510 or audio 515 of the original concatenated video and audio. As depicted in FIG. 5A, each video frame 510 and audio 515 excerpt may be associated with time 505 information or a timestamp (e.g. $t_1, t_2, \ldots, t_9$, etc.). For example, Frame $t_1$ is played at time $t_1$ for a duration of $t_2-t_1$. Similarly, Frame $t_3$ is played at time $t_3$ for a duration of $t_2-t_1$. Similarly, regarding the audio 515, an audio excerpt may be played at time $t_1$ for a duration of $t_2-t_1$. As shown in FIG. 4A, the video frames 510 of the original concatenated video may be missing Frame $t_2$ that would be played at time $t_2$ and Frames $t_5$ and $t_6$ which would be played at time $t_5$ and $t_6$ respectively. Additionally, the audio 515 from the original concatenated audio is missing an audio excerpt from time $t_5$ to $t_7$ as well as from time $t_8$ and $t_9$.

The VOD normalization module 360 modifies the original concatenated video and audio to eliminate the missing frames and the missing audio excerpts. However, to do so, the VOD normalization module 360 considers the audio 515 when normalizing the video frames 510 and vice versa. For example, at time $t_2$, frame $t_2$ is missing whereas an audio excerpt exists. In various embodiments, the VOD normalization module 360 chooses to repeat the immediately preceding frame. As shown in FIG. 4B, the VOD normalization module 360 inserts a copy of Frame $t_1$ to be played at time $t_2$. In other embodiments, the VOD normalization module 360 can choose to repeat the immediately subsequent frame (e.g. Frame $t_3$). Therefore, the original concatenated video will appear continuous while the audio at time $t_2$ remains unchanged.

Figure 5B:
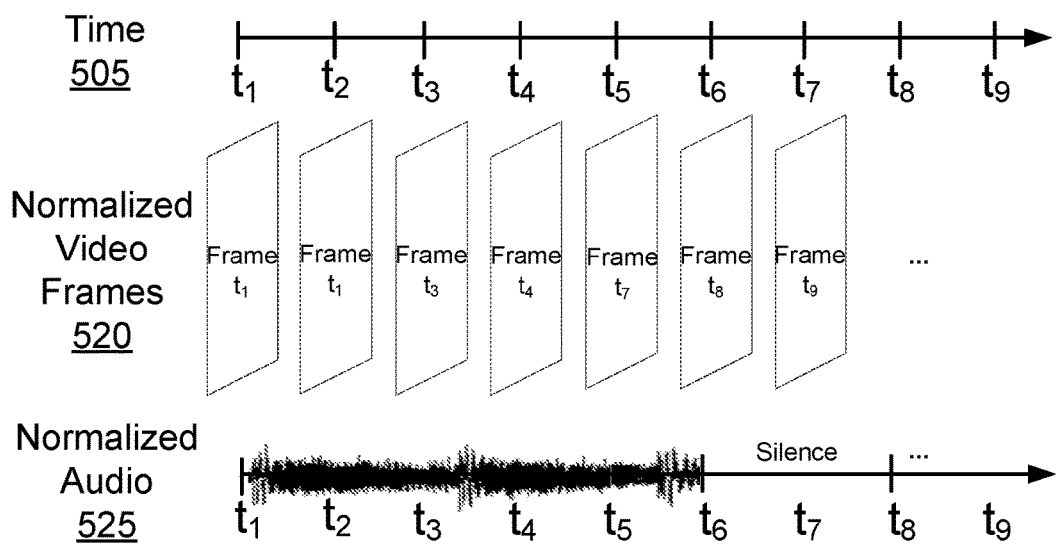

As another example, both video frames 510 and audio 515 are missing at time $t_5$ and $t_6$. In various embodiments, the VOD normalization module 360 can choose to shift all subsequent video frames 510 and all subsequent audio 515 that are associated with subsequent timing information. As depicted in FIG. 5B, Frame $t_4$ is played at time $t_4$ and subsequently, Frame $t_7$ is played at time $t_5$. Additionally, Frame $t_8$ is also shifted to be played at time $t_6$. Similarly, the audio 515 may be similar shifted to ensure that the audio continues to sync with the appropriate video frame. In this scenario, the audio excerpt that was originally to be played at time $t_7$ (see FIG. 5A) is normalized to be played at time $t_5$ (see FIG. 5B). Therefore, Frame $t_7$ remains aligned with the same audio excerpt.

As a third example, audio excerpts are missing from the original concatenated audio at time $t_8$ and $t_9$. In this scenario, the original concatenated video has video frames 410 that are to be played at the same timestamps. In various embodiments, the VOD normalization module 360 chooses to insert audio excerpts that correspond to silence (see FIG. 5B).

Referring to FIG. 5B, the VOD normalization module 360 generates a normalized original concatenated video that includes the normalized video frames 520 as well as a normalized original concatenated audio that includes the normalized audio 525. The normalized video frames 520 and normalized audio 525 shown in FIG. 4B would provide an improved viewing experience as compared to the original video frames 510 and original audio 515.

In various embodiments, the VOD normalization module 360 checks the normalized original concatenated video and normalized original concatenated audio to verify that the normalization process was correctly conducted and that the original concatenated content should be used as the VOD 375. For example, the VOD normalization module 360 retrieves the alternate concatenated encoded content 420 or 425 and verifies that it contains more or equal number of frames as compared to the normalized original concatenated content. If the normalized version of the original concatenated content is longer than the concatenated encoded content 420 or 425, then the VOD normalization module 360 deems that an error in the normalization process has occurred. In the scenario where a normalization error has occurred, even though the VOD evaluator 350 previously determined to normalize the original concatenated video/audio, the VOD generator module 315 may default to using another concatenated encoded content 420 or 425 to generate a VOD 375.

In other embodiments, the VOD normalization module 360 verifies the normalized concatenated original content by identifying its duration and determining whether its duration differs significantly from the duration of an alternate concatenated content 420 or 425. For example, if the normalized concatenated original content has 9,990 video frames and another concatenated encoded content 420 or 425 has 10,000 video frames, the VOD normalization module 360 determines that the normalized concatenated original content is verified and may be used as a VOD 375. However, if the normalized concatenated original content only has 5,000 video frames whereas the other concatenated encoded content 420 or 425 has 10,000 video frames, the VOD normalization module 360 may deem the normalized concatenated original content as inappropriate for generating a VOD 375 because it has lost too much information during the normalization process. Therefore, the other concatenated encoded content 420 or 425 can be used to generate the VOD 375.

If the normalized original concatenated video and normalized original concatenated audio are both verified, the VOD normalization module 360 provides both to the VOD transcoder module 355 to be encoded into a VOD and subsequently distributed to client devices 110.

Process for Generating an Optimal Video on Demand

Figure 6:
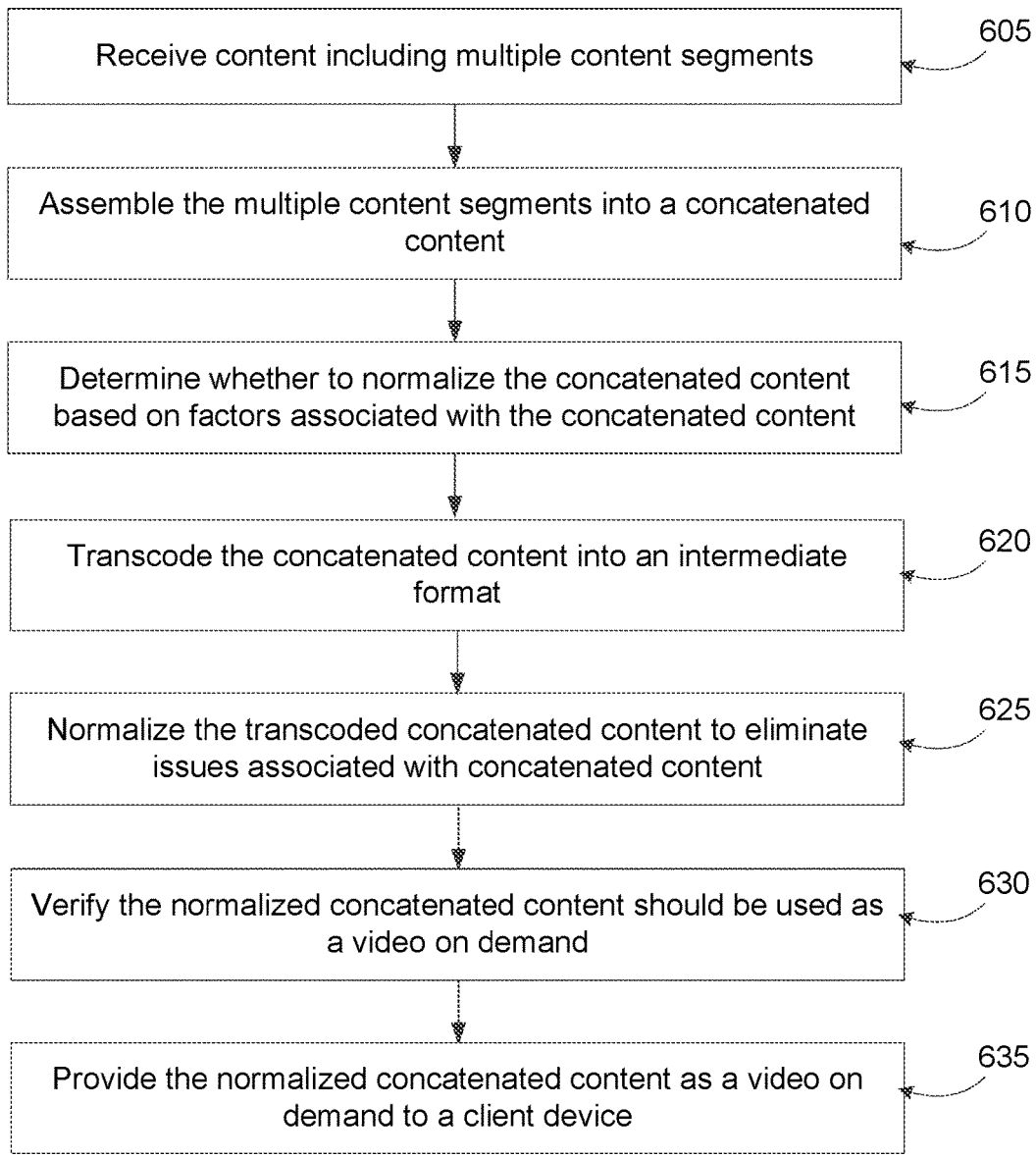
FIG. 6 illustrates a flow chart for encoding and distributing, by the online system, the video on demand to client devices, in accordance with an embodiment.

FIG. 6 illustrates a flow chart for encoding and distributing, by the online system, the video on demand to client devices, in accordance with an embodiment.

The online system 130 receives 605 content that is made up of multiple content segments. In various embodiments, the content is segmented content from a live stream that has now ended. Each segment represents a data packet corresponding to video or audio that was transcoded by the online system 130 and distributed to a client device 110. In other embodiments, the segments are original live video or original live audio received by the online system 130 from a content provider device 130 that has not undergone transcoding.

The online system 130 assembles 610 the multiple content segments into a concatenated content. More specifically, the concatenated content includes video and audio data that corresponds to the entirety of the live stream. The online system 130 may generate a wide variety of concatenated content from content that was previously transcoded (e.g. concatenated encoded content 420 or 425) or from original content (e.g. original concatenated content 430).

After the content is assembled, the online system 130 determines 615 whether to normalize the original concatenated content 430 to eliminate issues (e.g. missing video frames, missing audio excerpts). The decision to normalize the original concatenated content 430 is dependent on factors associated with the original concatenated content 430 such as the number of issues that exist, the duration of the original concatenated content 430 and the difference in quality between the original concatenated content 430 and the other concatenated encoded content 420 and 425.

If the online system 130 decides that the original concatenated content 430 will be used to generate the VOD 375, the online system 130 transcodes 620 the concatenated content by decoding the concatenated content and re-encoding the decoded concatenated content with a suitable encoder. The online system 130 then proceeds to normalize 625 the transcoded original concatenated content 430. The online system 130 may alter the timing information associated with the video and audio in order to eliminate any problems that would arise from the missing video frames or missing audio excerpts. For example, if a video frame is missing, the online system 130 may insert a video frame that is a copy of an adjacent video frame. Alternatively, if an audio excerpt is missing, the online system 130 inserts an audio excerpt corresponding to silence. If both a video frame and audio excerpt are missing at a particular time, the online system 130 shifts the subsequent video frames and audio excerpts to be played at that particular time.

After the normalization, in some embodiments, the online system 130 conducts a check to determine whether the normalization process was correctly conducted. The online system 130 verifies 630 that the normalization was appropriately conducted by comparing the normalized concatenated content to a previously transcoded concatenated content (e.g. concatenated encoded content 420 or 425). For example, if the normalized concatenated content is longer in duration (e.g. more video frames, more audio excerpts) than any concatenated encoded content 420 or 425, the online system 130 deems the normalization process as incorrectly conducted. Thus, the online system 130 may default to a concatenated encoded content 420 or 425 to generate a VOD 375. Upon verifying that the normalization process was appropriately conducted, the online system 130 provides 635 the VOD 375 to a client device 110 for playback.

General

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
for a first phase that occurs within a threshold amount of time after termination of a live broadcast of a media stream:
receiving media content in a plurality of media formats from a content provider, each media content in a media format including a plurality of video content segments and corresponding audio segments, and each media content in a media format corresponding to a different quality of the media stream;
for each media content in a media format, assembling the plurality of content segments into a concatenated content;

selecting one of the concatenated contents as a video on demand;

transmitting the video on demand during the first phase to a client device;

for a second phase that occurs after the first phase:

determining whether to normalize one of the concatenated contents based on one or more factors associated with one of the concatenated contents;

based on the determination, normalizing one of the concatenated contents to improve the quality of the concatenated content by:

identifying one or more missing video frames and one or more missing audio excerpts in the concatenated content;

identifying timing information associated with each missing video frame and each missing audio excerpt;

comparing the identified timing information associated with each missing video frame to identified timing information associated with each missing audio excerpt;

responsive to determining that the identified timing information associated with a missing video frame of the one more missing video frames does not match identified timing information associated with any of the one or more missing audio excerpts, performing at least one of:

inserting a repeated video frame corresponding to the identified timing information associated with the missing video frame, the repeated video frame being based on an immediately preceding or immediately subsequent video frame; and inserting a silent audio excerpt corresponding to the identified timing information associated with the missing audio excerpt; and providing the normalized concatenated content as a higher quality video on demand.

2. The method of claim 1, wherein normalizing one of the concatenated contents further comprises:

selecting the one of the concatenated contents for normalization;

decoding the selected concatenated content into an intermediate format; and encoding the decoded concatenated content into one or more encoded content.

3. The method of claim 1, further comprising:

responsive to determining that the identified timing information associated with a missing audio excerpt matches identified timing information associated with a missing video frame, shifting video frames and audio that are associated with subsequent timing information to eliminate the missing audio excerpt and missing video frame.

4. The method of claim 1, further comprising verifying the normalized concatenated content was appropriately generated.

5. A non-transitory computer-readable medium comprising computer program instructions, the computer program instructions, when executed by a processor of a computer device, cause the processor to:

for a first phase that occurs within a threshold amount of time after termination of a live broadcast of a media stream:

receive media content in a plurality of media formats from a content provider, each media content in a media format including a plurality of video content segments and corresponding audio segments, and each media content in a media format corresponding to a different quality of the media stream;

for each media content in a media format, assemble the plurality of content segments into a concatenated content;

select one of the concatenated contents as a video on demand;

transmit the video on demand during the first phase to a client device;

for a second phase that occurs after the first phase:

determine whether to normalize one of the concatenated contents based on one or more factors associated with one of the concatenated contents;

based on the determination, normalize one of the concatenated contents to improve the quality of the concatenated content by causing the processor to:

identify one or more missing video frames and one or more missing audio excerpts in the concatenated content;

identify timing information associated with each missing video frame and each missing audio excerpt;

compare the identified timing information associated with each missing video frame to identified timing information associated with each missing audio excerpt;

responsive to determining that the identified timing information associated with a missing video frame of the one more missing video frames does not match identified timing information associated with any of the one or more missing audio excerpts, perform at least one of:

insert a repeated video frame corresponding to the identified timing information associated with the missing video frame, the repeated video frame being based on an immediately preceding or immediately subsequent video frame; and insert a silent audio excerpt corresponding to the identified timing information associated with the missing audio excerpt; and provide the normalized concatenated content as a higher quality video on demand.

6. The non-transitory computer-readable medium of claim 5, wherein the computer program instructions that cause the processor to normalize one of the concatenated contents further comprises computer program instructions that, when executed by the processor, cause the processor to:

select the one of the concatenated contents for normalization;

decode the selected concatenated content into an intermediate format; and encode the decoded concatenated content into one or more encoded content.

7. The non-transitory computer-readable medium of claim 5, further comprising computer program instructions, the computer program instructions, when executed by a processor of the computer device, cause the processor to:

responsive to the determination that the identified timing information associated with a missing audio excerpt matches identified timing information associated with a missing video frame, shift video frames and audio that are associated with subsequent timing information to eliminate the missing audio excerpt and missing video frame.

8. The non-transitory computer-readable medium of claim 5, further comprising computer program instructions, the computer program instructions, when executed by a processor of the computer device, cause the processor to verify the normalized concatenated content was appropriately generated.

* * * * *

UNITED STATES PATENT AND TRADEMARK OFFICE
CERTIFICATE OF CORRECTION

PATENT NO.        : 10,271,074 B2
APPLICATION NO.   : 15/396149
DATED             : April 23, 2019
INVENTOR(S)       : Mathieu R. Henaire and Amit Puntambekar Page 1 of 1

It is certified that error appears in the above-identified patent and that said Letters Patent is hereby corrected as shown below:

In the Claims

Column 15, Line 24, Claim 1, delete "of the one more missing video frames" and insert -- of the one or more missing video frames --.

Column 15, Lines 45-46, Claim 2, delete "into one or more encoded content" and insert -- into one or more encoded contents --.

Column 16, Line 30, Claim 5, delete "of the one more missing video frames" and insert -- of the one or more missing video frames --.

Column 16, Lines 53-54, Claim 6, delete "into one or more encoded content" and insert -- into one or more encoded contents --.

Signed and Sealed this
Fifth Day of November, 2019

Andrei Iancu
*Director of the United States Patent and Trademark Office*